United States Patent [19]

Ayub et al.

[11] Patent Number: 4,956,398
[45] Date of Patent: Sep. 11, 1990

[54] NITRILE RUBBER/VINYL CHLORIDE POLYMER/SILICA COMPOSITIONS

[75] Inventors: Abdul L. Ayub, Clearwater; Herbert F. Schwarz, Sarnia, both of Canada

[73] Assignee: Polysar Limited, Sarnia, Canada

[21] Appl. No.: 362,562

[22] Filed: Jun. 7, 1989

[51] Int. Cl.$^5$ .................... C08K 9/04; C08K 3/36; C08L 27/06; C08L 35/04
[52] U.S. Cl. ......................... 523/209; 524/521; 524/833; 524/762
[58] Field of Search .................. 523/209; 524/521

[56] References Cited

U.S. PATENT DOCUMENTS

| | | | |
|---|---|---|---|
| 3,773,708 | 11/1973 | Takahashi | 523/209 |
| 4,150,014 | 4/1979 | Edwards | 260/42.32 |
| 4,152,308 | 5/1979 | Edwards et al. | |
| 4,179,421 | 12/1979 | Edwards et al. | |
| 4,608,401 | 8/1986 | Martin | |
| 4,771,086 | 9/1988 | Martin | 523/209 |

FOREIGN PATENT DOCUMENTS 1214685  2/1986  U.S.S.R. ............... 523/209

Primary Examiner—C. Warren Ivy
Attorney, Agent, or Firm—Stevens, Davis, Miller & Mosher

[57] ABSTRACT

The present invention provides a silica filled composition which contains vinyl chloride polymer and a nitrile rubber. The silica is characterized by being coated with a polymer which is prepared by the free radical emulsion polymerization of acrylate monomer. The compositions of the present invention have a good balance of physical properties and outstanding resistance to crack growth and hence are suitable for the manufacture of mechanical goods.

6 Claims, No Drawings

NITRILE RUBBER/VINYL CHLORIDE POLYMER/SILICA COMPOSITIONS

FIELD OF THE INVENTION

The present invention relates to silica reinforced compositions which contain a vinyl chloride resin and a nitrile rubber. The present compositions have a good balance of physical properties and exhibit excellent resistance to crack growth.

BACKGROUND OF THE INVENTION

The use of mineral fillers such as silica in polymer compounds is well known.

Particulate mineral fillers can be used to reduce the cost of compounds and to improve certain physical properties. However, incompatability between the filler and polymer can restrict the use of certain fillers. In particular, it is difficult to properly incorporate silica into some polymer compounds.

Many previous attempts have been made to improve the properties of silica-reinforced compounds.

For example, U.S. Pat. No. 4,150,014 discloses a process whereby the use of an amine additive is shown to enhance the preparation of silica-filled vulcanizates of a rubbery hydroxyl-functionalized polymer.

U.S. Pat. No. 4,152,308 describes silica filled rubbery vulcanizates which are prepared using an organic acid additive, or an organic acid salt additive.

U.S. Pat. No. 4,179,421 shows that silica filled vulcanizates may be prepared from polymers which contain epoxy functionality.

The above prior art processes generally require either a functionalized polymer, or a combination of a functionalized polymer plus a further additive in order to obtain optimum incorporation of the silica filler.

Finally, U.S. Pat. No. 4,608,401 teaches a process for completely encapsulating a water insoluble particle, which may be silica, using a polymer that is free of ionically changed groups.

Heretobefore, there have not been disclosed silica reinforced compounds of a vinyl chloride resin and a nitrile rubber, wherein the compounds are characterized by containing silica which is coated with an acrylate polymer.

The compositions of the present invention surprisingly demonstrate outstanding resistance to crack growth, as measured by ASTM D813.

SUMMARY OF THE INVENTION

The present invention provides a polymer composition comprising
  (i) from 5 to 95 parts by weight of vinyl chloride resin, and correspondingly to 100 parts combined weight,
  (ii) from 95 to 5 parts by weight nitrile rubber,
  (iii) from 5 to 40 parts by weight of coated silica per 100 parts combined weight of said vinyl chloride resin plus said nitrile rubber,
characterized in that said coated silica is prepared by
  (A) adding to a polymerization vessel:
    (a) from 20 to 80 parts by weight of a polymerizable monomer composition comprising at least 80 weight percent acrylate monomer
    (b) 100 parts by weight untreated silica
    (c) sufficient non-ionic emulsifier to emulsify said monomer composition,
    (d) free radical initiator,
  and
  (B) Polymerizing at least 50 weight percent of said monomer composition in the presence of said untreated silica.

DETAILED DESCRIPTION

The vinyl chloride resin used in the present invention is not particularly restricted in any manner and is preferably selected from the commercially available polyvinyl vinyl chloride ("PVC") resins. A comprehensive description of such PVC resins and methods of their manufacture is provided in "Encyclopedia of PVC", edited by L.I. Nass, and published by Marcel Dekker Inc. (1976). It is preferred to employ a PVC having a comparatively medium to high molecular weight, particularly those having a k value between 65 and 75. PVC sold under the tradename Esso ® PVC 369 by Esso Chemical Canada has been found to provide satisfactory results when used in the present invention.

The nitrile rubber is a rubbery copolymer of a $C_{3-5}$ $\alpha,\beta$ unsaturated nitrile (such as acrylonitrile or methacrylonitrile) and a $C_{4-6}$ conjugated diene (such as butadiene or isoprene). Acrylonitrile-butadiene rubber having from 18 to 50 weight percent bound acrylonitrile units (with the balance comprising bound butadiene units) is a commercially available example of this rubbery copolymer.

In addition to the $C_{3-5}$ $\alpha,\beta$ unsaturated nitrile monomer and the $C_{4-6}$ conjugated diene monomer, nitrile rubber may further contain a minor amount of a crosslinking monomer (such as divinylbenzene) or a carboxylic acid monomer (such as acrylic, methacrylic, fumaric and/or itaconic acid). The viscosity of the nitrile rubber is preferably within the range of 40 to 80 Mooney ($ML_{1+4}$ at 100° C.).

Nitrile rubber may be prepared by the well known free radical emulsion polymerization process.

The compositions of this invention contain silica which is coated with an acrylate polymer.

The preferred silica is precipitated, hydrated amorphous silica. Such silica is widely available and is conventionally used to reinforce elastomer and/or plastic-containing compounds. The typical average particle size of precipitated hydrated amorphorous silica is less than 325 mesh, which provides a surface area of 120 to 180 meters$^2$/gram.

As noted above, the silica is coated with an acrylate polymer. In particular, the coated silica is prepared by the emulsion polymerization of an acrylate-containing monomer composition in the presence of dispersed silica. The polymerization conditions are described below.

As used herein, the term "acrylate" monomer refers to the well known esters of acrylic or methacrylic acid which may be polymerized via a free radical process.

Suitable acrylate monomers include methyl methacrylate, ethyl methacrylate, isobutyl acrylate, n-butyl acrylate and diethyleneglycol dimethacrylate. The monomer composition may further contain a minor amount (less than 20 weight %) of other copolymerizable monomers, such as $C_{4-6}$ conjugated dienes, $C_{3-5}$ $\alpha,\beta$ unsaturated nitriles, carboxylic acids and styrenic monomers (such as styrene, α-methyl styrene and p-methyl styrene). Preferred monomer compositions comprise n-butyl acrylate (90 to 95 weight percent), diethylene glycol dimethacrylate (3 to 9 weight percent) and methacrylic acid (1 to 5 weight percent). The total amount of monomer used in the polymerization is from 20 to 80 parts by weight per 100 parts by weight silica.

The polymerization should not be terminated until at least 50 weight percent of the monomers have been polymerized. For reasons of cost and convenience, it is preferred that at least 90 percent of the monomers are polymerized.

It is essential to the present invention that the silica particles are coated with acrylate polymer which is prepared by a free radical emulsion polymerization process. The emulsifier is non-ionic and is preferably a polyethyoxylated ether of a fatty alcohol, a polyethyoxylated ester of a fatty acid or a polyethyoxylated nonylphenol having at least 50 ethylene oxide groups in the polyethylene oxide chain and a Hydrophylic Lipophylic Balance ("HLB") index value of at least 18.

As will be readily understood by those skilled in the art, the amount of non-ionic emulsifier which is sufficient to emulsify the acrylate monomer composition is dependent upon both of the amount of monomer and the surface activity of the emulsifier. Thus, although it is difficult to precisely quantify the amount of emulsifier, it is typically between 2 and 20 weight percent (based on the weight of the monomer).

The polymerization of the acrylate polymer coating for the silica is initiated and propagated by a free radical. Free radical initiator systems which are conventionally employed in the emulsion polymerization of nitrile rubber are suitable for use in the present invention. In general, there are two broad classes of free radical initiator systems, which may be referred to as "per-" systems and "redox" systems, respectively. "Per-" systems consist of a water soluble peroxide, hydroperoxide or persulphate which decomposes to provide a free radical. Suitable examples include benzoyl peroxide, cumene hydroperoxide, menthane hydroperoxide, para-menthane hydroperoxide, isopropyl butyl hydroperoxide, tertiary butyl hydroperoxide and alkali persulfates such as potassium persulfate. The decomposition rate of the "per-" initiator, which largely establishes the polymerization rate, is temperature dependent. A minimum temperature (the activation temperature of the "per-" initiator is required to support polymerization).

"Redox" systems comprise an oxidant and a reductant. The above described hydroperoxides are suitable oxidants. Preferred reductants include sodium formaldehyde sulfoxylate and soluble iron salts. When iron salts are employed, a minor amount of a chelating agent, especially ethylenediamine tetraacetic acid ("EDTA") is used to maintain the solubility of the iron species. Redox systems may be utilized at temperatures as low as 2° C.

A more detailed description of the "per-" and "redox" free radical initiator systems is given by W. Hoffman in Rubber Chemistry and Technology, volume XXXVII, April-June 1964, Part 2, p. 76–77.

It is highly preferred to utilize a "redox" system at a temperature between 50 and 70° C. when preparing the polymer coated silica of the present invention.

In addition to the aforedescribed vinyl chloride resin, nitrile rubber and acrylate-polymer coated silica, the compositions of the present invention may further contain conventional additives such as plasticizers, pigments, processing aids, stabilizers and antioxidants.

Any plasticizer which is utilized must be compatible with the polar vinyl chloride resin and nitrile rubber. The use of a phthalate-type plasticizer such as dioctyl phthalate is preferred.

Suitable processing aids includes stearic acid and calcium stearate.

Non reinforcing carbon black, titanium oxide and other conventional polymer pigments may be added in minor amounts.

The stabilizers used in the present invention may be one or more of the commercially available metal salts, organo metallic salts or soaps or organometallic compounds which are well known in the art of PVC compounding. These stabilizers are frequently sold on a proprietary basis, with their exact chemical composition not being disclosed. A description of available stabilizers which are used with PVC is given in Chapter 9 of "Encyclopedia of PVC", edited by L.I. Nass and published by Marcel Dekker Inc.(1976). Using the classification scheme described therein, suitable stabilizers for use in the present invention include lead salts, mixed metal salts, organotin stabilizers and organonickel stabilizers. Preferred stabilizers include the mixed metal salts of barium/cadmium, barium/cadmium/zinc, and barium/zinc and the organotin stabilizers. The total amount of stabilizers in a polymer blend for use in the process of the present invention is from about 1.0 to 4 parts by weight, preferably from about 1.5 to 3 parts by weight.

The antioxidants for use in the present invention may be one or more of any of the antioxidants which are used in the art of compounding heat resistant, carboxylated nitrile rubber. Suitable antioxidants include p-cumyldiphenylamine, octylated diphenylamine, polymerized 1,2 dihydro-2,2,4-trimethylquinoline, nickel sales of dibutyl- and dimethyl-dithiocarbamate, mercaptobenzimidazole and its zinc salts 2-mercaptobenzimidazole and its zinc salts, tris (nonylated phenyl) phosphite, p-phenylenediamine derivatives, and hindered phenolic antioxidants such as thiodiethylene bis (3,5-di-t-butyl-4-hydroxy) hydro cinnamate. The total amount of antioxidants used in compositions of the present invention is preferably from about 0.2 to 4 parts by weight per 100 parts by combined weight of the vinyl chloride polymer and nitrile rubber.

The invention is further illustrated by the following non limiting examples, in which all parts and percentages are by weight unless otherwise indicated.

Example 1

This example illustrates the preparation of acrylate-polymer coated silica.

The ingredients listed in "A" of Table 1 were first charged to a stirred polymerization vessel. The initial monomers ("B" of Table 1) were then added and the mixture was stirred and heated to 50° C. over a time period of about 30 minutes.

The initial oxidant ("C" of Table 1) was then added at a temperature of 50° C. Further heat was applied to the mixture and the initial amount of reducing agent ("D" of Table 1) was added about 5 minutes later, when the temperature was 55° C.

The "continuous addition" ingredients ("E" of Table 1) were then added at the indicated rate for a period of 30 minutes. At the end of this 30 minute period, the temperature was increased to 70° C. and maintained there for a further 60 minutes. The reaction was then terminated by the addition of 10 mls of a 2% aqueous solution of diethylhydroxyl amine ("DEHA").

The resulting "latex" was steam stripped to remove unreacted monomer.

A sample of the latex separated into two layers when left unagitated, indicating that the polymer coated silica was too dense to be completely suspended by the emulsifier.

However, the presence of a polymer coating on the silica was established by the tests described below.

Initially, an aqueous solution having a density of 1.09 g/cc was prepared by dissolving 10 g of potassium carbonate in 90 g of water. A sample of the polymer coated silica was added to this solution, and only a small "scum" of free polymer was observed (i.e., this test indicates the presence of only a minor amount of free polymer, as free polymer will float in the dense solution).

In another test, a sample of the polymer coated silica was vacuum dried, comminuted in a ball mill for about 1 hour and subjected to thermogravimetric analysis ("TGA") over the temperature range 30° to 800° C., which analysis indicates weight loss as a function of temperature.

The TGA curve indicated a significant loss of material between 200° and 500° C. As silica will not ash at these temperatures, it can be inferred that the observed weight loss resulted from the thermal destruction of the acrylate polymer. Final results from the TGA analysis showed that the acrylate-polymer coated silica had a 31 percent loss (weight/weight basis), attributed to the acrylate polymer coating (i.e. as the polymer could not be separated by the flotation test described above, it is concluded that the polymer forms a coating on the silica).

TABLE 1

| Ingredients | Amount |
| --- | --- |
| A | |
| water | 6500 g |
| non ionic emulsifier[1] | 60 g |
| Silica[2] | 600 g |
| B | |
| n-butyl acrylate (n-BA) | 300 ml |
| di-ethylene glycol dimethacrylate (EGDMA) | 18 ml |
| methacrylic acid (MA) | 9 ml |
| C | |
| t-butyl hydroperoxide | 0.8 mg |
| D | |
| sodium formaldehyde sulfoxylate | 0.8 mg |
| E (continuous addition) | |
| monomer mixture[3] | 10 ml/min. |

TABLE 1-continued

| Ingredients | Amount |
| --- | --- |
| oxidant[4] | 1 ml/min |
| reductant[5] | 1 ml/min |

Notes:
[1]Polyethyoxylated nonyl phenol, sold under the tradename Igepal CO-997 by GAF.
[2]Precipitated, amorphous silica, sold under the tradename HiSil ® 233 by PPG.
[3]n-BA/EGDMA/MA in 300/18/9 weight ratio.
[4]Aqueous solution (3.8 g in 34 g $H_2O$).
[5]Aqueous solution (2.4 g in 34 g $H_2O$).

Example 2

This example illustrates the preparation of silica-filled nitrile rubber/vinyl chloride polymer compositions.

The compositions of comparative experiments 20 and 21 were prepared with untreated silica. The compositions of comparative experiments 22 and 23 were prepared with untreated silica and an acrylate polymer. (The acrylate polymer of comparative experiments 22 and 23 was prepared using the same type and amount of monomers described in the polymerization of example 1. The polymerization conditions were also generally the same as those described in example 1, except that no silica was present during the polymerization and the emulsifier was an anionic detergent, instead of the nonionic emulsifier used in the polymerization of example 1).

The compositions of inventive experiments 24 and 25 were prepared with acrylate polymer-coated silica prepared according to the process described in example 1.

The compositions were prepared by mixing the ingredients listed in Table 2 in a banbury-type mixer which was preheated to an initial temperature of 95° C. and mixing until the temperature reached 165°-170° C. (approximately 6 minutes). The compositions were dumped from the mixer and sheeted on a two roll mill. Sample specimens were prepared by compression molding for a two minute molding cycle.

Physical properties were measured according to ASTM D638 (tensile strength), ASTM D790 (modulus), ASTM D1238 (melt flow index, or "MFI"), ASTM D2240 (hardness) and ASTM D813 (resistance to crack growth).

The inventive compositions have a good balance of physical properties and excellent resistance to crack growth, as clearly illustrated by the results shown in Table 2.

TABLE 2

| | Experiment | | | | | |
| --- | --- | --- | --- | --- | --- | --- |
| | 20 | 21 | 22 | 23 | 24 | 25 |
| Ingredients (parts by weight) | | | | | | |
| PVC[1] | 626 | 626 | 626 | 626 | 626 | 626 |
| NBR[2] | 324 | 324 | 324 | 324 | 324 | 324 |
| DOP | 377 | 377 | 377 | 377 | 377 | 377 |
| Stabilizer[3] | 20 | 20 | 20 | 20 | 20 | 20 |
| Stabilizer-2[4] | 6.7 | 6.7 | 6.7 | 6.7 | 6.7 | 6.7 |
| Calcium stearate | 6.7 | 6.7 | 6.7 | 6.7 | 6.7 | 6.7 |
| Titanium dioxide | 20 | 20 | 20 | 20 | 20 | 20 |
| Silica[5] | 98 | 196 | 98 | 196 | — | — |
| Coated silica[6] | — | — | — | — | 142 | 284 |
| poly(n-BA/EGDMA/MA)[7] | — | — | 44 | 88 | — | — |
| Physical Properties | | | | | | |
| Shore "A" Hardness | 76 | 78 | 76 | 80 | 80 | 78 |
| 100% Modulus (MPa) | 5.4 | 5.9 | 5.0 | 5.9 | 5.7 | 5.0 |
| Ultimate Tensile Strength (MPa) | 13.6 | 14.0 | 13.6 | 11.4 | 11.0 | 12.7 |
| Ultimate Elongation (MPa) | 460 | 445 | 450 | 380 | 350 | 420 |
| MFI[8] (g/10 min) | 11.6 | 5.3 | 9.2 | 6.0 | 5.7 | 9.2 |

TABLE 2-continued

| | Experiment | | | | | |
|---|---|---|---|---|---|---|
| | 20 | 21 | 22 | 23 | 24 | 25 |
| Crack Growth Resistance[9] (cycles) | 162,500 | 132,500 | 216,667 | 26,667 | > 250,000 | > 250,000 |

Notes:
[1]Polyvinyl chloride, sold under tradename Esso ® PVC 369 by Esso Chemical Canada.
[2]Acrylonitrile-butadiene rubber having a bound acrylonitrile content of 33 weight percent and a Mooney viscosity ($ML_{1+4}$ at 100° C.) of 75, sold under the trademark KRYNAC ® 1122P by Polysar Limited.
[3]Cadmium-based stabilizer, sold under tradename Ferro 1288 by Ferro Corp.
[4]Phosphate stabilizer, sold under tradename POLYGARD ® by Uniroyal Chemical.
[5]Precipitated, amorphous silica, sold under tradename Hi-Sil ® 233 by PPG.
[6]Prepared according to example 1.
[7]Prepared by polymerizing: n-BA(91.7%)/EGDMA(5.5%)/MA(2.8%)
[8]21.6 kg load, at 190° C.
[9]Number of cycles for 600% cut growth (DeMattia flex test), starting from a standard cut of 2 mm.

We claim:
1. A polymer composition comprising
   (i) from 5 to 95 parts by weight of vinyl chloride resin, and correspondingly to 100 parts combined weight,
   (ii) from 95 to 5 parts by weight nitrile rubber,
   (iii) from 5 to 40 parts by weight of coated silica per 100 parts combined weight of said vinyl chloride resin plus said nitrile rubber,
characterized in that said coated silica is prepared by an aqueous emulsion polymerization process utilizing water and a non-ionic emulsifier, wherein said process consists of
   (A) adding to a polymerization vessel:
      (a) from 20 to 80 parts by weight of a polymerizable monomer composition comprising at least 80 weight percent acrylate monomer
      (b) 100 parts by weight untreated silica, such that said silica is dispersed in said water,
      (c) sufficient non-ionic emulsifier to emulsify said monomer composition,
      (d) free radial initiator,
   and
   (B) polymerizing at least 50 weight percent of said monomer composition in the presence of said untreated silica.

2. The composition of claim 1 wherein said non ionic emulsifier has an HLB index number of at least 18.

3. The composition of claim 2 wherein said untreated silica is a precipitated, hydrated, amorphous silica having a surface area of from 120 to 180 meters$^2$/gram.

4. The composition of claim 3 wherein said acrylate monomer composition comprises from 90 to 95 weight percent n-butyl acrylate, from 3 to 9 weight percent diethylene glycol dimethacrylate and from 1 to 5 weight percent methacrylic acid.

5. The composition of claim 4 wherein said nitrile rubber has a Mooney viscosity ($ML_{1+4}$ at 100° C.) of from 40 to 80.

6. The composition of claim 1 which further contains stabilizer, pigment and plasticizer.

* * * * *